United States Patent [19]

Vitous

[11] Patent Number: 5,765,334
[45] Date of Patent: Jun. 16, 1998

[54] METHOD OF MANUFACTURING POROUS BUILDING MATERIALS

[76] Inventor: Miroslav L. Vitous, c/o Smitco, Front Street #5 Phillipsburg, St. Martin, Anguilla

[21] Appl. No.: 799,578

[22] Filed: Feb. 12, 1997

[51] Int. Cl.[6] .................................................. E04C 1/41
[52] U.S. Cl. ................... 52/745.19; 52/144; 52/309.17; 52/405.1; 181/294
[58] Field of Search ..................... 52/144, 145, 405.1, 52/309.17, 745.19; 181/210, 284, 285, 294

[56] References Cited

U.S. PATENT DOCUMENTS

| 1,824,240 | 9/1931 | Smith ................................ 52/405.1 X |
| 2,052,517 | 8/1936 | Roos ................................. 52/405.1 X |
| 2,340,535 | 2/1944 | Jenkins . | |
| 2,791,020 | 5/1957 | Heine . | |
| 2,825,420 | 3/1958 | Heine . | |
| 3,182,747 | 5/1965 | Wilhelmi et al. . | |
| 3,204,380 | 9/1965 | Smith et al. . | |
| 4,094,380 | 6/1978 | Kobayashi et al. ................... 52/144 X |
| 4,585,685 | 4/1986 | Forry et al. ......................... 181/284 X |
| 4,611,445 | 9/1986 | Pressley . | |
| 4,815,243 | 3/1989 | Pardo . | |

FOREIGN PATENT DOCUMENTS

| 2704015 | 10/1994 | France . |
| 6-42071 | 2/1994 | Japan . |
| 9424381 | 10/1994 | WIPO . |

Primary Examiner—Christopher Kent
Attorney, Agent, or Firm—Richard C. Litman

[57] ABSTRACT

A building panel is formed using particulate mineral material, such as sand, with an adhesive binder, to form an aggregate. The mix undergoes a heating process to cure the adhesive, which also produces a porosity in the panel. The relative quantities of the materials are such that the resulting panel is porous after heating, with the interstices between particles being devoid of binder material. The resulting porosity provides for the limited passage of air and moisture, particularly water vapor, through the panels so the panels may "breathe" to allow circulation through a structure composed of the present panels, and also provides acoustic properties. The present panels are non-flammable, in accordance with the non-flammable materials used in the formation thereof. The panels may be colored or tinted as desired, by adding a coloring material (epoxy paint or other suitable coloring agent) which may be mixed with the sand and adhesive binder before heating. In one embodiment, the panels are a homogeneous construction having a uniform thickness, but in an alternative embodiment the panels include a cavity formed in one side thereof, for the insertion of acoustic material (such as glass fiber roving or mat, etc.) therein to add further acoustic qualities to the panels.

10 Claims, 4 Drawing Sheets

METHOD OF MANUFACTURING POROUS BUILDING MATERIALS

BACKGROUND OF THE INVENTION

1. Field of the Invention

The present invention relates generally to prefabricated building construction materials and panels, and more specifically to building panels formed of a coarse said material suspended in an adhesive matrix. The panels are formed have a porosity, through which air, water vapor, and liquid water may pass. The panels are useful for both interior and exterior construction, as the porosity greatly impedes, but does not completely preclude, the flow of fluids and gases through.

2. Description of the Prior Art

The advance of technology has permitted newer materials, and older known materials used in different ways and combinations, to be used in the construction of building panels and other prefabricated components. Generally, it has been considered desirable to provide better insulation, sealing, durability, and fire and weather protection in the building construction field, and as a result the materials which have been developed have tended to provide such features or qualities, including having a relatively impervious nature to preclude the passage of the elements therethrough.

However, such imperviousness is not always desirable, as evidenced by screens, open declarative block, and other structural and non-structural building materials and panels. Depending upon the climate, it may be desirable in some areas to provide solid, opaque building panels which provide most of the benefits of such panels (non-flammability, durability, acoustic insulation, etc.) while still providing at least limited porosity for air circulation. Accordingly, the present invention provides such panels in various embodiments thereof, for use in the building trade where applicable. A discussion of the prior art known to the present inventor, and its differences from the present invention, is provided below.

U.S. Pat. No. 2,340,535 issued on Feb. 1, 1944 to Paul W. Jenkins describes Building Material comprising expanded vermiculite (a hydrated silicate mineral) and gypsum (a hydrated calcium sulphate used in the manufacture of plaster, etc.) These materials are subject to dehydration when exposed to extreme heat (as in a fire), which leads to their shrinking cracking, and losing strength. Jenkins combines the two materials to avoid such cracking (which cracks by definition produce a porous material). Thus, Jenkins teaches away from the present invention, with its deliberately porous nature and the heating process used in the manufacture of the present panels. In any event, the materials used by Jenkins are dissimilar to those used in the present invention, with its coarse sand material and adhesive binder.

U.S. Pat. No. 2,791,020 issued on May 7, 1957 to Henry W. Heine describes a Method Of Making Composite Fireproof Acoustical Tile, wherein the ceramic material is mixed with a carbonaceous material which is then burned out during the baking process to leave a porous ceramic material. The glaze is accomplished in a similar manner. The present invention also uses a hearing process during manufacture, but the heat assists in tile cure of the adhesive used to bind the sand grails together with voids therebetween to provide a porous panel. The present panels also inherently include acoustic properties, but may also have such acoustic materials added to a specialty formed panel in addition to the acoustic properties of the panels themselves, if desired.

U.S. Pat. No. 2,825,420 issued on Mar. 4, 1958 to Henry W. Heine describes Acoustical Tile And Method Of Manufacturing It, wherein a clay base is mixed with a large quantity of water and carbonaceous material before baking or firing. The process is similar to that described immediately above in the '020 patent to the same inventor, but including the addition of water to the material to produce steam during firing.

U.S. Pat. No. 3,182,747 issued on May 11, 1965 to Hans Wilhelmi et al. describes Sound Absorbing Micro-Porous Wall Panel Structures. The panels are formed by mixing a fast evaporating solvent with a curing material. The evaporation of the solvent leaves interconnected voids in the material. The resulting panels are relatively thin and flexible, and do not contain minerals such as sand, as in the present panels.

U.S. Pat. No. 3,204,380 issued on Sep. 7, 1965 to Burton F. B. Smith et al. describes Acoustical Tiles With Thermoplastic Covering Sheets And Interlocking Tongue-And-Groove Edge Connections. The tiles are formed of fibrous materials in a binding agent, rather than using quartz sand as used in a preferred embodiment of the present invention. Smith et al. overlay the panels with a non-porous plastic sheet or film bonded along the common peripheries of the tile and sheet. Such an impervious sheet teaches away from the present porous panel invention.

U.S. Pat. No. 4,611,445 issued on Sep. 16, 1986 to James 0. Pressley describes a Sag-Resistant Ceiling Panel formed of mineral wool (glass fiber, etc.) treated with lithium carbonate. The lithium carbonate treatment delays the diversification and crystallization of the fibers at high temperatures, so such a panel will possess greater strength to resist sagging and falling in the event of a fire. The present panels may be used as ceiling panels, but, as the panels themselves are not formed of fiber material (as opposed to any acoustic insert which may be added to the panels), the lithium carbonate treatment of Pressley is not applicable to the present panels.

U.S. Pat. No. 4,815,243 issued on Mar. 28, 1989 to Jorge Pardo describes Concrete Masonry Block And Stud Wall Construction Systems, comprising specially formed solid concrete blocks adapted for placement in interior walls. No porosity is disclosed, nor are the blocks formed of sand with an adhesive binder, as in the present invention.

Japanese Patent Publication No. 6-42071 published on Feb. 15, 1994 relates to the addition of a water repellent agent to porous ceramic acoustic material, to improve the acoustic properties of the material if it becomes wet or damp. The present panels include acoustic properties, but no substantial degradation of those properties occurs when the panels become wet, due to the water impervious adhesive and mineral materials used. The present panels may also incorporate additional acoustic means if desired.

French Patent Publication No. 2,704,015 published on Oct. 21, 1994 to Jurg Scheiwiller relates to a composite acoustic panel having a fibrous acoustic material completely captured within a hollow acoustic mortar panel, and including a metal reinforcing screen therein. The mortar panel may be formed of sand and a synthetic resin, as in the present panel, but no disclosure is made regarding any structural features lending porosity to the mortar panel, or a method of forming such porous features, as provided in the present panel.

Finally, World Patent Publication No. 94/24381 published on Oct. 27, 1994 to Jurg Scheiwiller relates to a sound absorbent material. This publication is related to the '015

French patent publication to the same inventor, and discussed immediately above. The same differences and distinctions apply here as those described above in the discussion of the '015 French patent publication.

None of the above inventions and patents, taken either singly or in combination, is seen to describe the instant invention as claimed.

SUMMARY OF THE INVENTION

The present invention is al building panel and a method by which it is constructed. The panel is preferably formed using a particulate mineral, such as sand, with an adhesive binder used to bind the particles together to form the panel. The present panels are homogeneous in construction and include acoustic properties, but may include a cavity in one side for the insertion of acoustic material therein. A novel feature of the panels is their porosity, achieved in a heating process during their formation as the adhesive is cured. The particulate base material may be colored by mixing with a dye, paint, or other suitable agent prior to mixing with the adhesive to produce colored panels, if desired. The materials used are non-flammable.

Accordingly, it is a principal object of the invention to provide an improved building panel formed predominantly of a particulate mineral such as a coarse, rough sand, using an adhesive binder to form an aggregate.

It is another object of the invention to provide an improved building panel which is porous to allow air and moisture passage therethrough, and which is also non-flammable.

It is a further object of the invention to provide an improved building panel which may be colored by means of a coloring agent or resin therewith, as desired.

An additional object of the invention is to provide an improved building panel which may include a cavity formed in one side thereof.

Still another object of the invention is to provide an improved building panel having a cavity for the placement of acoustic materials therein.

Yet another object of the invention is to provide a method of manufacturing an improved building material.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
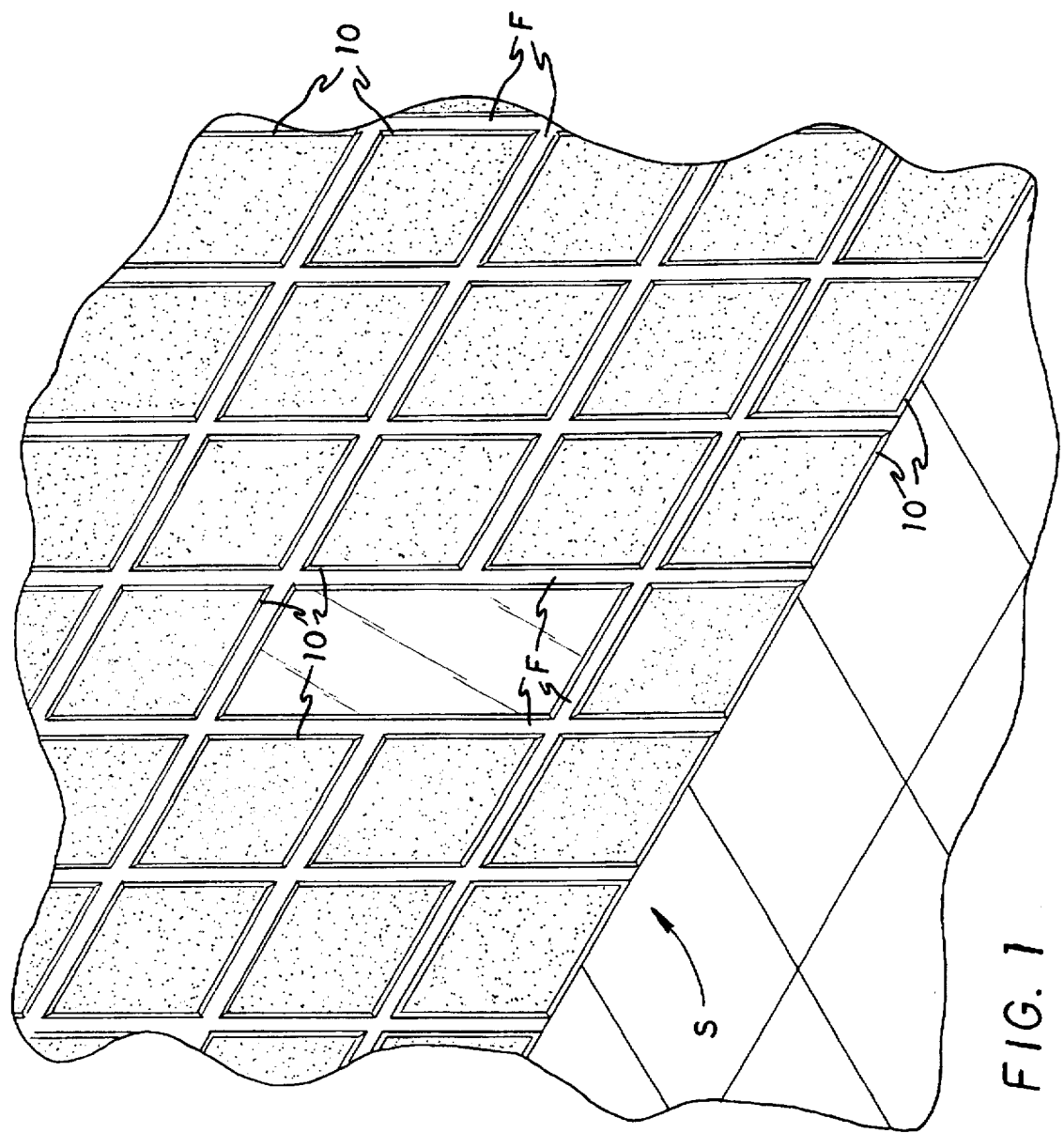
FIG. 1 is an environmental perspective view of a building structure incorporating a plurality of the present panels to form an exterior wall.

The present invention comprises a porous, non-flammable building panel 10 which may be used for interior and exterior construction of walls and ceilings, as desired. An exemplary structure S is shown in FIG. 1, with a panel frame F holding a plurality of such panels 10 in a rigid wall structure. (It will be understood that such panels 10 may be formed in any practicable size and shape, and are not limited to the substantially wide and flat, square configuration shown in the various drawing figures.)

The present panels 10 are particularly well suited for use in relatively mild environments as exterior wall panels, with the porosity of the panels 10 allowing some movement and circulation of air and water vapor therethrough (and limited flow of liquid water therethrough, if exposed to a standing head of water for a sufficient time). Thus, the panels 10 may be considered to "breathe" to allow circulation through the structure S. The porous nature of the panels 10 also provides a myriad of air cavities to break up sound transmission therethrough, thus providing acoustic properties in addition to the "breathable" nature of the panels 10.

Figure 2:
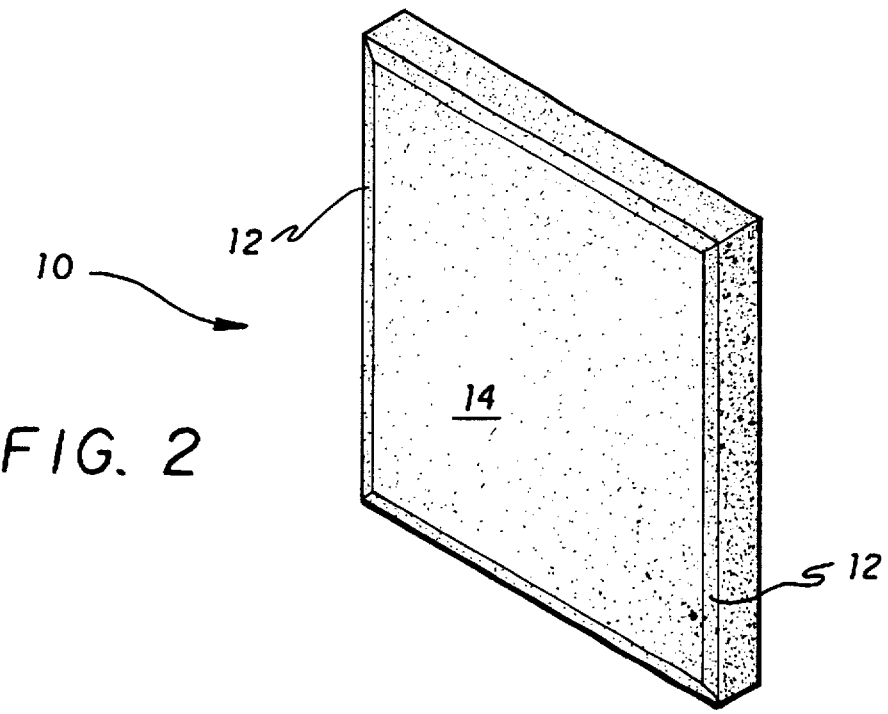
FIG. 2 is a perspective view of a single panel of the present invention.

FIG. 2 provides a view of a single panel 10. The panels 10 of the present invention are formed using a non-flammable granular particulate mineral in a matrix or binder of adhesive material. It has been found that a quartz sand having relatively rough and coarse grains works well, in that the roughness of the grains provides a good "tooth" to which the adhesive material may adhere, with a relatively coarse texture accounting for a part of the creation of the required interstitial spaces between individual grains for the desired porosity during the manufacturing process, even after the particulate matter has been bound together by the adhesive.

The adhesive material is preferably a synthetic resin of a suitable type, i. e., one that does not break down when exposed to moisture, ultraviolet light (sunlight), etc. An epoxy resin has been found to have suitable properties, although other resins, such as polyesters, may be substituted where suitable.

The present panels 10 are formed by mixing a suitable quantity of the particulate material (sand, etc.) with an appropriate quantity of the adhesive (resin) and forming the mix into a suitable shape. The mix of particulate material and adhesive binder is then heated under specific conditions to harden and cure the adhesive binder to form a rigid aggregate, an example of which is shown in FIG. 2. The specific heating process, in combination with the specific materials used, also creates the porosity in the panels.

The panels 10 of the present disclosure are shown with beveled edges 12 about the periphery of the first surface 14 thereof, for ease of fastening such aggregate panels 10 into a frame F. However, other configurations may be used, and the panels may be adhesively or mechanically secured in place (bolts, etc.), as desired.

Preferably, the quantity of adhesive binder used is relatively small in comparison to the quantity of particulate matter used in the formation of the present panels 10. While the above noted specific heating process is responsible for the preponderance of the porous nature of the completed panels 10, it will be seen that the inclusion of too much adhesive binder will result in the interstices between particles being filled to a certain extent and at least partially blocking the gaps and voids otherwise formed throughout the completed aggregate. A mix of about 90 percent particulate matter and about 10 percent adhesive has been found to work well, but other ratios may be used according to the desired result.

Figure 3:
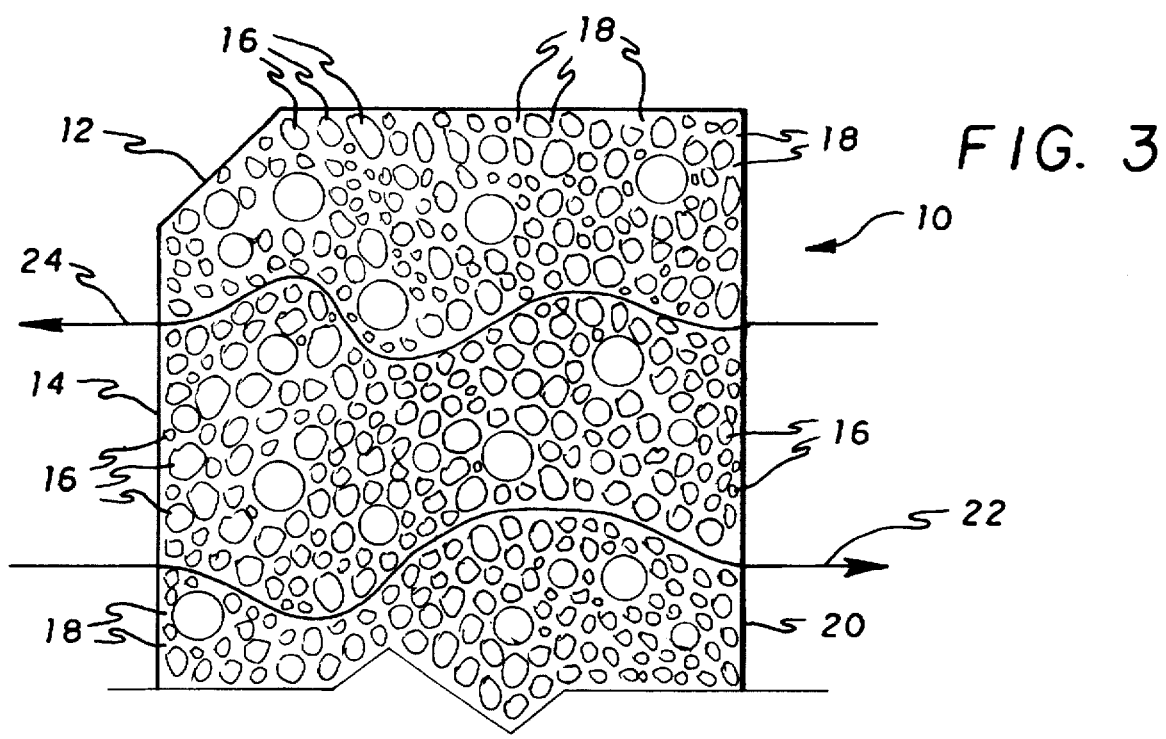
FIG. 3 is a side elevation view in section of a portion of one of the present panels, showing the previous nature of the panel structure.

FIG. 3 provides a side elevation view in section of one of the present panels 10. It will be seen that the panel 10 is predominantly formed of a multitude of individual particulate grains 16, which are adhered together by relatively small amounts of adhesive material between adjacent grains. (It will be understood that the granular size may be exaggerated in the drawing figure, and that irregular, roughened grains may be preferred.)

By thoroughly mixing the relatively small amount of adhesive (resin, etc.) with the relatively large amount of granular material, each of the grains becomes substantially coated with the adhesive and will adhere on contact to an adjacent grain. It will be seen that a relatively thin coating of adhesive on the grains, as opposed to immersion in a larger quantity of the adhesive material, will result in a myriad of interstices 18 between the multitude of particulate grains 16.

When the adhesive has hardened and cured during the heating process, these interstitial spaces 18 result in a porosity which allows air or other gaseous vapor to flow through the aggregate panel 10 from the first surface 14 to the opposite second surface 20, as indicated by the inward flow arrow 22, or to flow equally as well through the panel 10 from the second surface 20 and out through the first surface 14, as indicated by the outward flow arrow 24.

Figure 4:
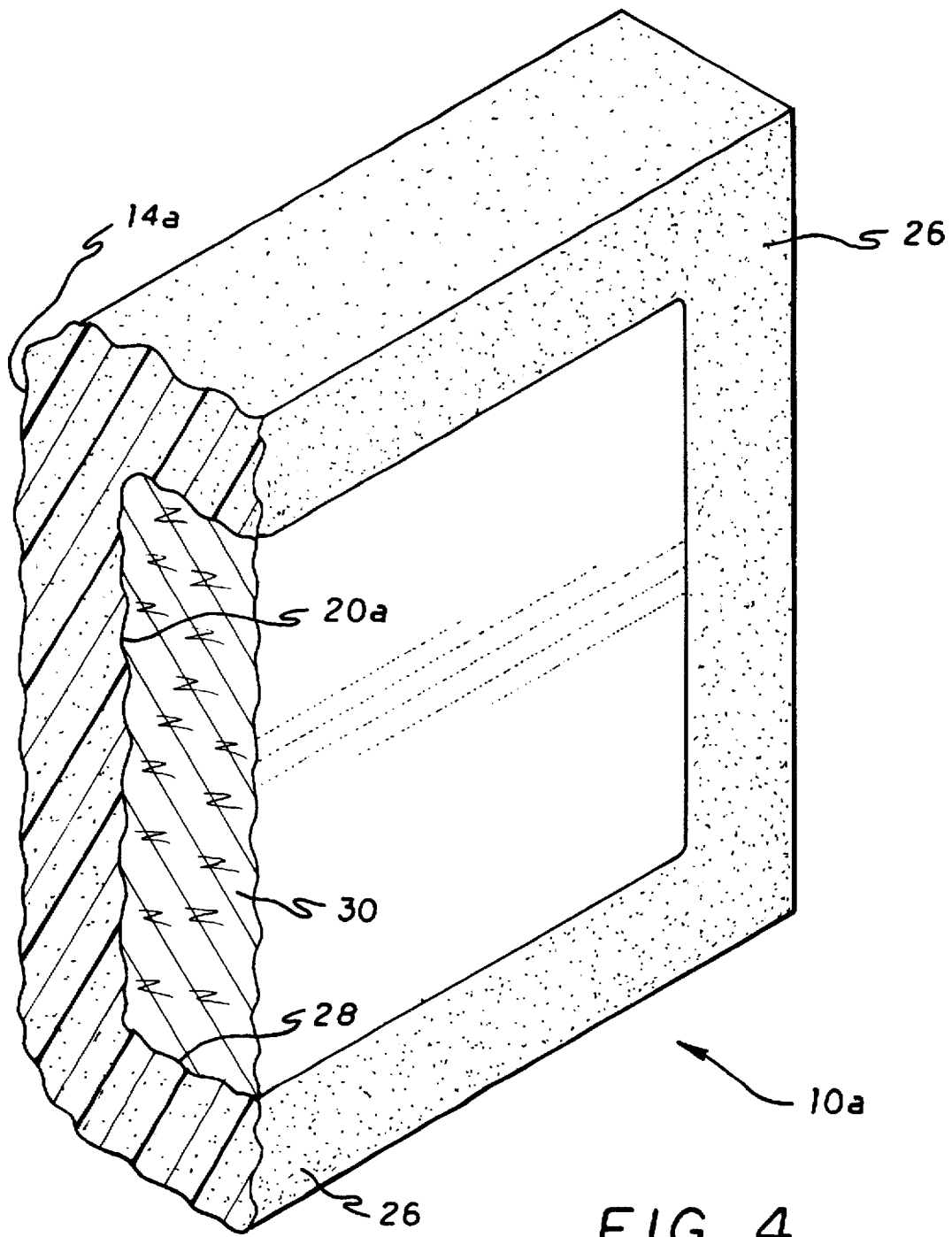
FIG. 4 is a perspective view in section of an alternative embodiment of the present panel invention, showing a cavity formed in one side thereof with the cavity being filled with a sound absorbent material.

The resulting aggregate panel, 10 is a solid, substantially homogeneous mass having essentially a uniform thickness defined by the first and second surfaces 14 and 20. However, other configurations may be formed, as shown in FIG. 4. The panel 10a of FIG. 4 includes a first surface 14a, analogous to the first surface of panel 10. However, the opposite second surface 20a will be seen to be inset within the second surface periphery 26 of the panel 10a, thus defining a cavity or depression 28 contained within the second surface periphery 26.

This depression 28 may be used to contain insulating materials of various sorts, such as the acoustic insulation material 30 ("sound proofing") shown in FIG. 4. In keeping with the intended environment of use of the present panels 10 and 10a, the acoustic material 30 is preferably a porous non-flammable material, such as a glass fiber roving or mat, etc. Various mineral wools and other non-flammable acoustic materials may be placed within the depression or cavity as desired, to substantially fill the depression 28. It will be understood that the porous nature of the present panels, with their myriad interstitial air spaces therein, provide fairly good acoustic attenuation without need for further acoustic panels installed thereto. However, the embodiment of FIG. 4 provides for such if so desired.

It is anticipated that the present building panels 10 and 10a will be exposed, at least on their first surfaces 14 and 14a, rather than being concealed, which would tend to negate the effect of the porosity of the panels 10 and 10a. Accordingly, the panels 10 and 10a may be colored or tinted as desired at the time of manufacture, by adding a coloring agent to the particulate matter and allowing it to cure before mixing the adhesive binder with the particulate matter. This mixing of the coloring agent with the particulate material and adhesive will result in each of the grains of material being substantially coated by the coloring agent prior to the heating process, with the panels 10 and 10a taking on the color of the coloring agent used in the formation of the panels 10 and 10a, whatever that color may be.

Figure 5:
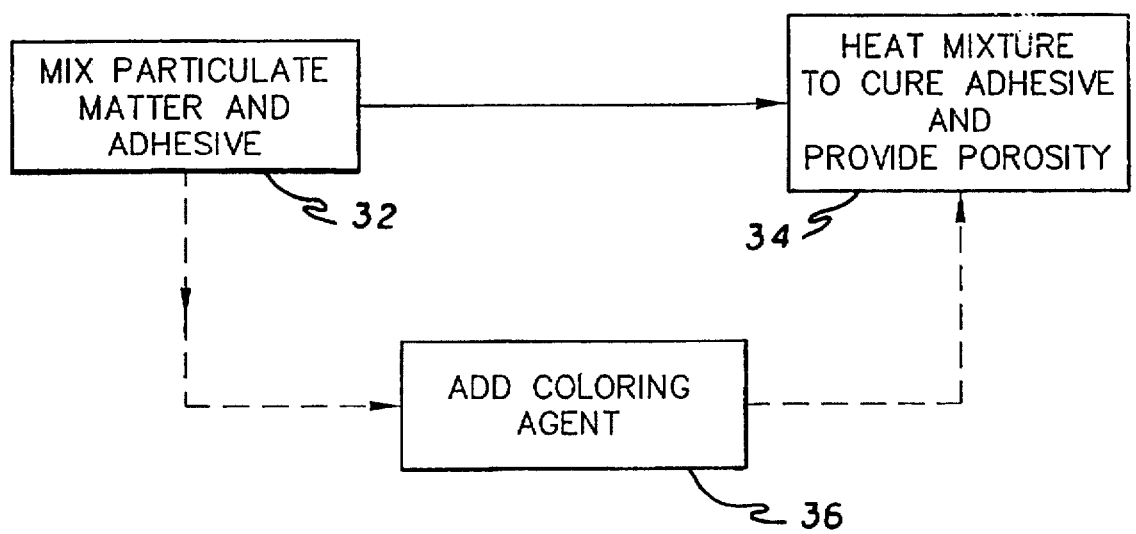
FIG. 5 is a flow chart disclosing the basic steps in the method of manufacturing the present building panels.

FIG. 5 is a block diagram disclosing the basic steps in the manufacture of the present panels 10 and 10a. In the first step 32, the particulate matter (e. g., coarse sand) and adhesive binder are mixed in suitable proportions, with the particulate matter accounting for the majority of the mass of the mixture. The particulate and adhesive mixture is then heated in accordance with a specific process to cure the adhesive binder, as indicated in the second step 34 of FIG. 5. If it is desired that the completed panels be colored or tinted in some way, a coloring agent (epoxy paint, or other suitable coloring agent or material as desired) may first be added to the particulate matter and allowed to cure, then mixed with the adhesive binder and heated, as indicated in the optional third step 36 of FIG. 5.

In summary, the present building panel 10, and alternate embodiment 10a, will be seen to provide an attractive, durable, yet economical, means of providing wall and ceiling panels for building structures. The present panels 10 and 10a are particularly well suited for mild or tropical climates, where the porous nature of the panels allows a building structure constructed using such panels, to "breathe," passing air and water vapor through the myriad interstitial passages of each of the panels. Yet, the panels are formed of non-flammable materials and are rigid when cured, to meet most safety and building codes. The acoustic properties of the panels 10, even without the addition of further acoustic material thereto, provide good noise attenuation as well, for use as exterior building panels.

The depression or cavity which may be provided in embodiments of the present panel, e. g. , the panel 10a of FIG. 4, allows various insulation means (soundproofing, temperature control, etc.) to be placed therein to improve the efficiency of the panel 10a. As the panels 10 and 10a are anticipated to be visible in most construction, they may be tinted or otherwise colored by providing a coloring agent which may be mixed with the granular material and adhesive binder used in the formation of the present panels 10 and 10a, prior to the heating of the aggregate mix to cure and harden the adhesive material. The resulting panels in any of their embodiments may be used to form a rapidly and economically constructed structure, which will serve its users efficiently and attractively for quite some time.

It is to be understood that the present invention is not limited to the sole embodiment described above, but encompasses any and all embodiments within the scope of the following claims.

I claim:

1. A method of forming a building panel, comprising the steps of:

(a) providing a first quantity of particulate mineral matter and a second quantity of adhesive binder;

(b) mixing the particulate mineral matter and the adhesive binder together; and (c) heating the particulate mineral matter and adhesive binder mix to cure and harden the adhesive binder, thereby forming a rigid aggregate having a myriad of interstices therethrough for the passing of air and water vapor through the rigid aggregate.

2. The method of forming a building panel according to the method of claim 1, further including the step of forming the rigid aggregate of non-flammable materials.

3. The method of forming a building panel according to the method of claim 1, wherein the step of providing a first quantity of particulate mineral matter includes using quartz sand grains.

4. The method of forming a building panel according to the method of claim 3, wherein the step of using quartz sand grains includes using rough and irregular quartz sand grains.

5. The method of forming a building panel according to the method of claim 1, wherein the step of providing a second quantity of adhesive binder includes using a synthetic resin selected from the group of synthetic resins consisting of epoxy resin and polyester resin as the adhesive binder.

6. The method of forming a building panel according to the method of claim 1, further including the step of coloring the rigid aggregate by adding a coloring agent to the particulate mineral matter prior to mixing the particulate mineral and adhesive binder.

7. The method of forming a building panel according to the method of claim 1, further including the step of forming the rigid aggregate as a wide, and flat panel having a first surface and an opposite second surface.

8. The method of forming a building panel according to the method of claim 7, further including the step of forming a depression in the second surface of the rigid aggregate.

9. The method of forming a building panel according to the method of claim 8, further including the step of filling the depression with an acoustic material.

10. The method of forming a building panel according to the method of claim 9, wherein the step of filling the depression with an acoustic material includes using a non-flammable material as the acoustic material.

* * * * *